March 26, 1968
I. MARTINIDES
3,375,404
CONTROL CIRCUIT FOR MACHINE TOOL HAVING CAM OPERATED
ELECTRONIC SWITCH MEANS
Filed Jan. 12, 1965
2 Sheets-Sheet 1
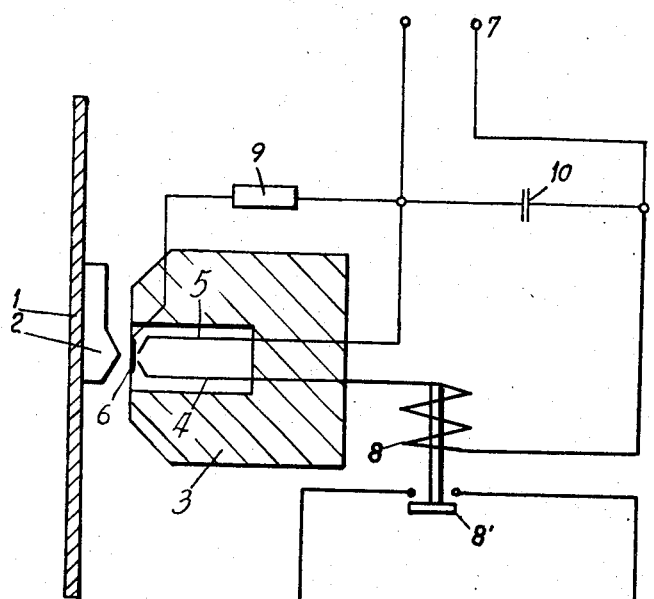
Fig.1
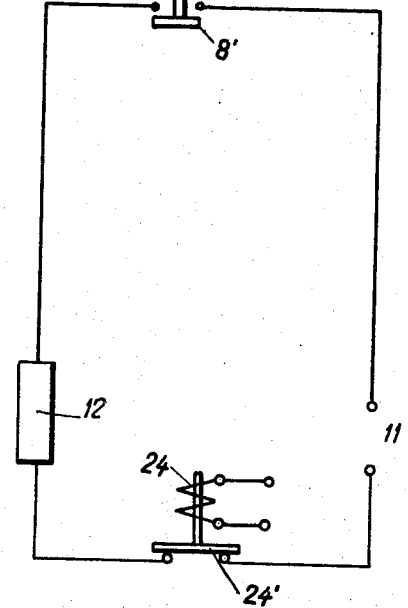

March 26, 1968     I. MARTINIDES     3,375,404
CONTROL CIRCUIT FOR MACHINE TOOL HAVING CAM OPERATED
ELECTRONIC SWITCH MEANS Filed Jan. 12, 1965     2 Sheets-Sheet 2

United States Patent Office 3,375,404
Patented Mar. 26, 1968

3,375,404
CONTROL CIRCUIT FOR MACHINE TOOL HAVING CAM OPERATED ELECTRONIC SWITCH MEANS
Ivo Martinides, Neuhausen am Rheinfall, Switzerland, assignor to Georg Fischer Aktiengesellschaft, Schaffhausen, Switzerland
Filed Jan. 12, 1965, Ser. No. 425,007
Claims priority, application Switzerland, Jan. 22, 1964, 694/64
3 Claims. (Cl. 315—360)

ABSTRACT OF THE DISCLOSURE

Control circuit for machine tool in which an electronic switch adapted for operation by the proximity thereto of a cam is provided with the cam adjustably mounted on one element of a machine tool and the switch mounted on another element of the machine tool with the elements of the machine tool being relatively movable so that the cam passes close by the electronic switch.

The present invention relates to a machine tool in which partial movements or partial strokes are electrically controlled by means of cams displaceably arranged on a rail system. By "partial movements" or "partial strokes" is meant movements, for instance a carriage, a table, or a spindle by electric motors over a certain predetermined distance.

The employment of a rail system with cams displaceable thereon is generally known in connection with machine tools. One of the heretofore known electric control systems of the above-mentioned type employs a rail system with cams adapted mechanically to actuate toggle switches or micro-switches. These types of switches, however, are subject to dust collection and soiling, especially by sprays or liquids. Even with the best sealing of the said switches, however, a soiling thereof cannot be entirely prevented.

In an effort to remedy the above drawback, toggle switches were replaced by magnetic contacts which were fused into air-tight envelopes or the like. With this arrangement, instead of cams, magnetic heads were displaceably arranged on the rail system. While with this system soiling is prevented, it is, however, liable to be affected by falling iron chips.

It is, therefore, an object of the present invention to provide an electric control arrangement for machine tools, which will overcome the above-mentioned drawbacks.

It is another object of this invention to provide an electric control arrangement for machine tools, which, while employing a rail system with cams displaceably mounted thereon, will be protected against soil and iron chips.

These and other objects and advantages of the invention will appear more clearly from the following specification in connection with the accompanying drawings, in which:

FIGURE 1 diagrammatically illustrates a cam with a control circuit according to the invention;

Figure 2:
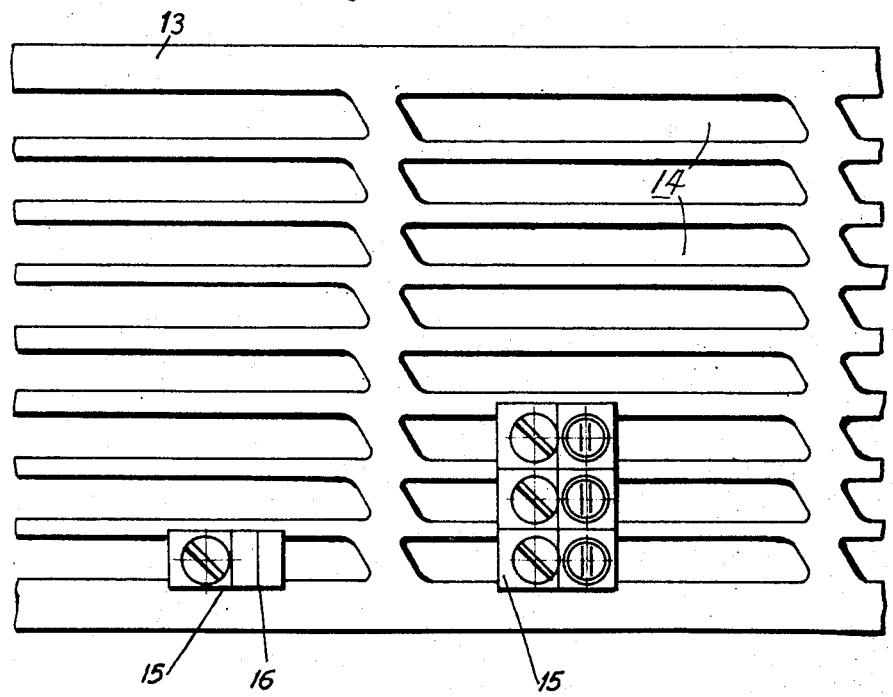
FIGURE 2 is a top view of a rail system with four set cams.

The present invention differs from heretofore known arrangements of the type involved primarily in that the switches operable by adjustable cams are designed as electronic switches which comprise a cold cathode relay tube the starter of which is designed as a contact electrode.

According to a particularly advantageous embodiment of the invention, the contact electrode may be designed as a rectangular body the longitudinal side of which is parallel to the control edge of the cam.

According to a further advantageous embodiment of the invention, the contact electrode is designed as a three-edge prism one edge of which extends into the path of movement of the control cam and is adapted to be engaged by the latter.

Referring now to the drawing in detail, FIG. 1 comprises a rail system 1 with longitudinal slots into which cams 2 may be inserted in a manner known per se. The arrangement furthermore comprises an electronic switch 3 with an anode 4 and a cathode 5. The rail system or the electronic switch is movable. There is furthermore provided an outer electrode 6 designed as contact electrode and adapted to act as starter for the firing of the electronic switch 3. The arrangement furthermore comprises a current source adapted through the intervention of electronic switch 3 to actuate a relay 8. The electronic switch 3 is a cold cathode relay tube the starter 6 of which is connected through a resistor 9 with a conductor connected to the cathode. A condenser 10 is in a manner known per se arranged in parallel to relay 8 and is connected to a current source 7.

FIG. 1 also shows a second circuit with a current source 11 and a motor 12 which by means of a blade 8' controlled by relay 8 is adapted to be connected to or to be disconnected therefrom. Motor 12 may be employed with a machine tool, for instance a lathe, as the motor for effecting the carriage feed. When the feeding movement has been completed, another cam engaging another electronic switch opens a normally closed switch 24' through a relay 24.

FIG. 2 diagrammatically illustrates a top view of a rail system 13 provided with longitudinal slots 14 adapted to receive adjustable cams 15 which can be connected to said rail system. The control edge of the cams is designated with the reference numeral 16.

Figure 3:
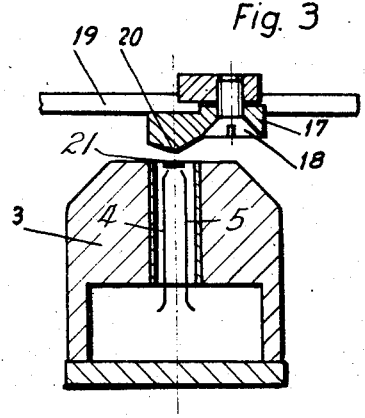
FIGURE 3 is a diagrammatic cross-section through an electronic switch and a displaceable cam.

Referring now to FIG. 3 illustrating a cross-section through an electronic switch and a displaceable cam, these elements are shown in a position in which the electronic switch is switched on. The adjustable cam 17 is clamped fast on a rail system 19 by means of a screw 18. With the arrangement shown in FIG. 3, the control edge 20 of cam 17 occupies a position directly opposite the contact electrode 21. In order to initiate the release or firing of the electronic switch precisely at a desired position of the control cam, the contact electrode 21 may also be designed as a rectangular body the longitudinal side of which is parallel to the control edge 20 of cam 17.

Figure 4:
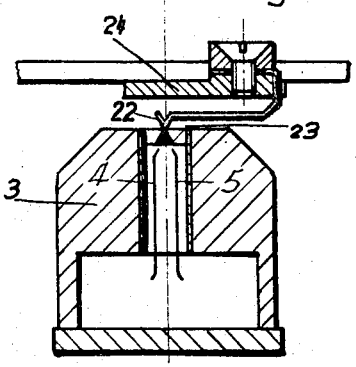
FIGURE 4 is a cross-section through a modified electronic switch and displaceable cam.

Embodiments are possible in which the control edge 20 is moved to the contact electrode 21 at a spacing therefrom of .1 to .5 millimeter. Also embodiments according to FIG. 4 are possible in which the control edge 22 metallically engages a contact electrode 23. In order to be able, with the embodiment shown in FIG. 4, to initiate a particularly precise locally determined swtiching action, the contact electrode is designed as a three-edge prism the outer edge of which extends into the path of movement of a control cam 24 and is adapted to be engaged by the latter.

The embodiment of FIG. 4 may also be so selected that the contact electrode 23 is covered by an insulating or non-conducting layer, for instance of polyacetal or polyamide, not shown in the drawing, and the firing of the electronic switch is likewise effected by a capacitance.

Assuming that motor 12 is a feed motor for a lathe, it will be appreciated that when electronic switch 3 is fired by a correspondingly set cam 2 actuating starter 6, relay 8 is energized thereby causing blade 8' to close the circuit for motor 12. Another cam will at an appropriate time bring about breaking of the circuit for motor 12.

The electric control for machine tools according to the present invention has the advantage that the control elements are non-sensitive with regard to soiling and are thus less liable to disturbances. An electronic pushbutton as control element is also magnetically immune, and, therefore, cannot be affected by iron chips. Electronic switches are likewise not affected by liquids as, for instance cooling water or cooling oil employed in a chip removing machine tool. The electronic switch as a control element is also advantageous from an economic standpoint and represents an inexpensive solution to the problem of program controlled partial movements or partial strokes of a machine tool.

It is, of course, to be understood that the present invention is, by no means, limited to the particular arrangement shown in the drawings, but also comprises any modifications within the scope of the appended claims.

What I claim is:

1. For use in connection with a machine tool: rail means, cam means displaceably connected to said rail means, an electronic switch means including a cold cathode relay tube having starter means formed by a contact electrode, said rail means and switch means being moveable relatively in the direction of the length of said rail means, said contact electrode being arranged adjacent the path of movement of said cam means so as to be influenced by said cam means, said electronic switch means being operable when fired by said starter means to control electric circuit means, said cam means having a control edge, and said contact electrode being in the form of a rectangular body having a longitudinal side parallel to said control edge of said cam means for cooperation therewith.

2. An arrangement according to claim 1 in which the closest distance between said control edge and said contact electrode is within the range of 0.1 to 0.5 millimeter.

3. For use in connection with a machine tool: rail means, cam means displaceably connected to said rail means, and electronic switch means including a cold cathode relay tube having starter means formed by a contact electrode designed as a trihedral prism, said rail means and switch means being moveable relatively in the direction of the length of said rail means, said prism having an edge within the path of movement of said cam means and engageable by the latter for actuation of said switch means in a precise position of said cam means relative to said switch means.

References Cited

UNITED STATES PATENTS

| 1,884,569 | 10/1932 | Chapman | 200—16.1 |
| 2,662,944 | 12/1953 | Carney | 200—46 |
| 3,061,764 | 10/1962 | Paul | 200—46 |
| 3,209,089 | 9/1965 | Weissburg | 200—16.1 |

FOREIGN PATENTS

| 457,753 | 3/1928 | Germany. |
| 457,754 | 3/1928 | Germany. |

JAMES W. LAWRENCE, *Primary Examiner.*

STANLEY D. SCHLOSSER, *Examiner.*